United States Patent
Rudolph et al.

(10) Patent No.: US 6,501,804 B1
(45) Date of Patent: Dec. 31, 2002

(54) METHOD FOR THE TRANSMISSION OF DIGITAL SIGNALS

(75) Inventors: Dietmar Rudolph; Christian Hoerlle, both of Berlin; Andreas Schaefer, Freiwalde, all of (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/297,859

(22) PCT Filed: Nov. 3, 1997

(86) PCT No.: PCT/EP97/06042

§ 371 (c)(1),
(2), (4) Date: May 7, 1999

(87) PCT Pub. No.: WO98/21849

PCT Pub. Date: May 22, 1998

(30) Foreign Application Priority Data

Nov. 8, 1996 (DE) .......................................... 196 46 164

(51) Int. Cl.⁷ .......................... H04B 15/00; H04K 1/02; H04L 25/49; H04L 25/03; H04L 1/00
(52) U.S. Cl. .......................... 375/285; 375/296; 375/346
(58) Field of Search ................................. 375/224, 226, 375/227, 259, 268, 269, 278, 279, 284, 285, 295, 296, 316, 346, 349, 350; 455/296, 303; 381/94.7; 714/746

(56) References Cited

U.S. PATENT DOCUMENTS

| | | | | |
|---|---|---|---|---|
| 4,835,790 A | * | 5/1989 | Yoshida et al. ............ | 375/227 |
| 5,313,497 A | | 5/1994 | Sadot et al. | |
| 5,351,245 A | | 9/1994 | Pregont et al. | |
| 5,428,832 A | * | 6/1995 | Nohara et al. ............ | 455/296 |
| 5,428,833 A | * | 6/1995 | Reitberger et al. ......... | 455/304 |
| 5,430,894 A | * | 7/1995 | Nohara et al. ............ | 455/296 |
| 5,485,470 A | | 1/1996 | Yamada | |
| 5,640,401 A | * | 6/1997 | Yamada ..................... | 714/716 |
| 5,727,073 A | * | 3/1998 | Ikeda ....................... | 381/94.7 |
| 5,903,615 A | * | 5/1999 | Thomson et al. .......... | 375/346 |
| 5,995,567 A | * | 11/1999 | Cioffi et al. ............... | 375/346 |
| 6,122,015 A | * | 9/2000 | Al-Dhahir et al. ......... | 348/614 |
| 6,154,487 A | * | 11/2000 | Murai et al. ............... | 375/150 |

FOREIGN PATENT DOCUMENTS

| | | |
|---|---|---|
| DE | 42 01 542 | 8/1983 |
| DE | 35 11 274 | 9/1986 |
| DE | 40 04 576 | 2/1991 |
| DE | 43 35 843 | 4/1995 |
| DE | 44 30 348 | 2/1996 |
| EP | 0 708 546 | 4/1996 |

OTHER PUBLICATIONS

M. Bidlingmaier et al., "Einheiten–Grundbegriffe–Meβverfahren der Nachrichten–Übertragungstechnik", Siemens AG, vol. 4, 1973, pp 142–150, 183–184.*

Bernard Widrow et al. "Adaptive Noise Cancelling: Principles and Applications", Proceedings of the IEEE, vol. 63, No. 12, Dec. 1975, pp. 1692–1716.

* cited by examiner

*Primary Examiner*—Stephen Chin
*Assistant Examiner*—Lenny Jiang
(74) *Attorney, Agent, or Firm*—Kenyon & Kenyon

(57) ABSTRACT

A method for the transmission of digital signals, particularly in the AM bands (broadcasting bands), with high-level modulation, preferably 32 APSK or 64 ASPK, being used for data blocks to be transmitted. At the receiving end, time-periodic measurements of a noise are carried out and noise signals determined therefrom are subtracted from received signals.

10 Claims, 2 Drawing Sheets

METHOD FOR THE TRANSMISSION OF DIGITAL SIGNALS

FIELD OF THE INVENTION

The invention relates generally to a method for transmission of digital signals, and more particularly to a method for the transmission of digital signals in the AM bands with noise suppression.

RELATED TECHNOLOGY

In digital broadcasting transmission, it is necessary, for reasons of efficiency, to use high-level modulation methods such as 64 APSK (Amplitude Phase Shift Keying). However, such high-level modulation methods have the disadvantage that even small noise signals cause the corruption of the received data. This problem is solved, on the one hand, in that the transmission power is set suitably high, so that the influence of the smaller noise signal is reduced. On the other hand, noise suppression systems are used at the receiving end; such noise-suppression systems filter out the noise signal from the received signal. This has the advantage that the transmitter can be operated at a lower power.

Described in the article "Adaptive Noise Cancelling: Principles and Applications", B. Widrow et al., Proceedings of the IEEE, VOL. 63, No. 12, December 1975, pages 1692 to 1716 is a structure with two signal inputs at the receiving end. Present at the first signal input is the desired signal including a noise. Present at the second signal input is the noise alone. This noise present at the second input is adaptively filtered and subtracted from the received signal at the first input. The result is then the desired signal requiring further processing.

This noise suppression system has the disadvantage that use must be made of a complex, and therefore expensive, adaptive filter. Furthermore, it is necessary for the noise signal alone to be constantly measurable. This system cannot be used for broadcasting applications.

SUMMARY OF THE INVENTION

A object of the present invention, therefore, is to provide a method for the transmission of digital signals in which the suppression of noise signals is possible using simple means.

The present invention therefore provides a method for transmitting digital signals comprising: modulating the digital signals onto a carrier; transmitting a test sequence and the digital signals in a periodic alternating fashion, the test sequence having essentially no direct component; averaging the test sequence at a receiver end so as to detect a noise carrier; and subtracting the noise carrier from the digital signals at the receiver end.

The fact that, at the receiving end, time-periodic measurements of a noise are carried out and that noise signals determined therefrom are subtracted from received signals allows a simple construction which, in particular, does not require an adaptive filter. In addition, it is not necessary for the noise signal to be constantly present in a form separate from the transmitted data stream.

It has proved particularly advantageous to precede each transmitted data block with a sequence of binary data, referred to as a test sequence, said binary data being modulated at a low level, for example by means of 2PSK modulation. Preferably, the test sequence is in the form of a pseudo-random sequence which is sufficiently long and has no direct component. By means of the aforementioned low-level modulation process, it is possible in simple manner at the receiving end to determine, first, the frequency and, second, the phase thereof, this being required for the processing of the data blocks.

Preferably, in order to determine a noise signal, an interval of the test sequence is selected and averaged. The fact that the actual binary data cancel each other out during averaging means that merely the noise signal is left, which is then subtracted from the received data signal.

In a further advantageous embodiment of the present invention, the transmitted signal sequence has so-called gaps in which the transmitter transmits nothing. These gaps are repeated periodically and are used by the receiver to measure noise signals.

BRIEF DESCRIPTION OF THE DRAWINGS

The present invention is now explained in greater detail on the basis of an exemplary embodiment with reference to the drawings, in which.

DETAILED DESCRIPTION

In digital transmission in the (conventional) AM bands (broadcasting bands), use is made of the hitherto existing channel grid of 9 kHz. Of course, it is possible, depending on the region, to use a channel grid of 10 kHz, the transmissible data rate being increased by approximately 11%. In this way, a better audio quality and/or a higher rate for the additional data can thus be achieved. In the case of a single-carrier process, the receiver derives the information, for example, about the bandwidth used, from a defined portion of the transmitted data, for example, from a test sequence.

Figure 2A:
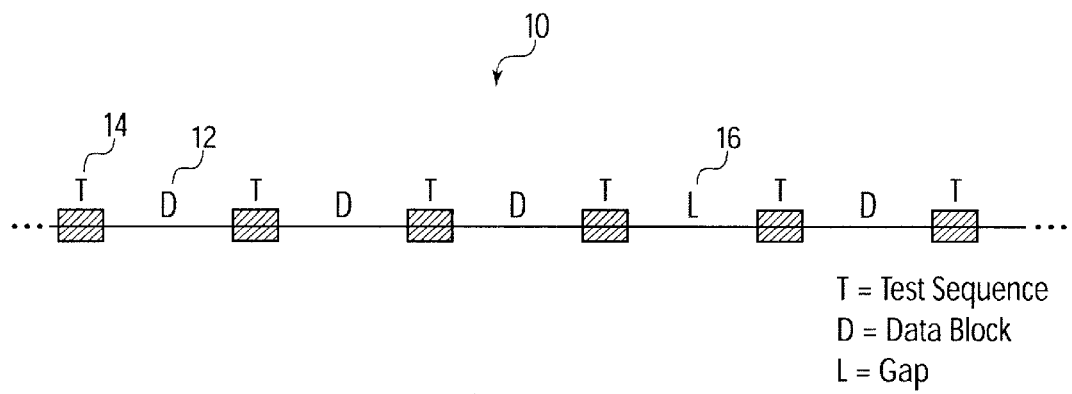
FIG. 2a shows a schematic representation of a data stream.

In a process according to the present invention, a data stream 10 is transmitted which comprises different alternating sequences, as shown in FIG. 2a. The first sequence to be mentioned is a sequence referred to as a "data block" 12, within which the digitized wanted signal is transmitted. As already mentioned, the binary data of the wanted signal is subjected to high-level modulation, for example 64 APSK modulation. The data block is preceded by the likewise already mentioned test sequence 14, the binary data of which contain a variety of information required for the recovery of the wanted signal at the receiving end. In contrast to the data of the data block, the data of the test sequence is subjected to low-level modulation, for example, using the 2PSK process.

The indicated succession of test sequence and data block is repeated periodically, the test sequence being transmitted preferably 25 times per second.

At greater periodic intervals, for example once per second, the data block is replaced by a sequence referred to as a "gap" 16. Within this time segment, the transmitter transmits no information, with the result that the receiver receives only a noise signal, if there is one.

The test sequence itself has a plurality of functions in the receiver. Thus, for example, it contains the information about whether the transmission is analog or digital. In the case of a digital transmission, the receiver deduces the channel bandwidth with the associated settings. Furthermore, it is possible to determine from the test sequence not only the exact amplitude of the signal, but also the precise carrier frequency and the precise phase thereof as well as the precise timing of the clock pulse. This information is necessary for demodulation. It is thereby possible to dispense with the hitherto employed phase-locked loop. Moreover, it is possible to determine the pulse response of the transmission channel and the transmission function of the channel, this allowing the setting of an adaptive equalizer in order to eliminate noise from the received data. Consequently, one obtains the "single frequency network" capability of digital transmission with the single-carrier process, because the receiver does not differentiate between an echo and the signal from another transmitter.

Figure 2B:
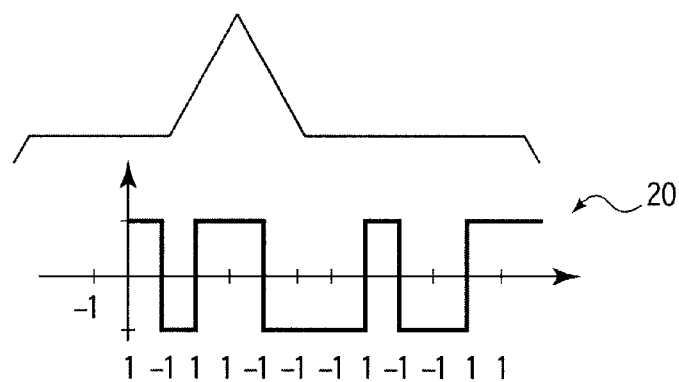
FIG. 2b shows a graph of a pseudo-random sequence of binary data.
Figure 2C:
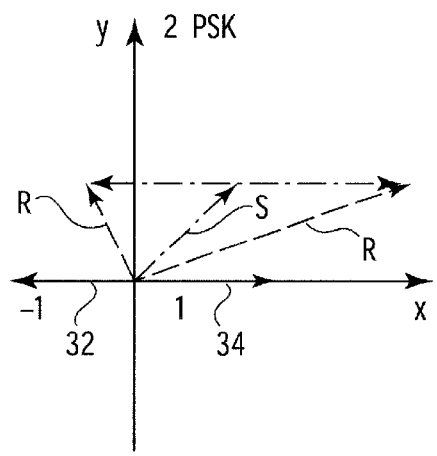
FIG. 2c shows a 2PSK diagram.

Ultimately, it is possible to measure an existing noise signal on the basis of the test sequence. The noise signal is understood as a noise carrier originating from an AM transmitter operating in the same channel. The frequency of this noise carrier is almost in the center of the channel bandwidth, since broadcasting transmitters usually transmit with a very high frequency accuracy. The determination of the noise carrier according to amplitude and phase now takes place as follows:

Referring now to FIGS. 2b and 2c, in and after "sequence" insert 20 the (digital) transmitter, a pseudo-random sequence 20 is generated and is processed using a low-level modulation process, in this case 2PSK, and is transmitted. A pseudo-random sequence 20 is understood as a sequence of binary data which is not repeated and the average of which is zero, i.e., which has no direct component. FIG. 2b shows schematically such a sequence with the values 1, −1, the average of which is zero, with the result that the sequence has no direct component. In the 2PSK diagram shown in FIG. 2c, the data −1 and the data +1 are described, respectively, as a vector 32 extending to the left and change "a vector extending to the right" to a vector 34 extending to the right and as a vector extending to the right on the X-axis. The so-called decision-making threshold is identical in the present case with the Y-axis. This signal, received by the receiver in the ideal case, is superimposed with the noise carrier signal, which is shown in the 2PSK diagram as a broken line and identified with S. The receiver, therefore, receives the signals, identified with R, for the data −1 and 1. The received signals R are then averaged in the receiver over a sufficiently long period of time. Since, as mentioned, the binary data 1, −1 cancel each other out in the average, one obtains, after averaging, noise carrier S. When the data block is received, this noise carrier is then subtracted from the received data, the result being the wanted signal without the noise carrier.

Owing to the fact that the noise carrier itself varies only very little with regard to frequency and phase, it is possible in the present case to use the measured noise carrier signal for data received later in time.

In the event that the frequency of the noise carrier is different from the mid-frequency of the channel, a difference angle can be calculated from two successive measurements of noise carrier signal S. This difference angle is then divided by the number of clock pulses between the two measurements, the result being the change of angle per clock pulse. On this basis, it is possible to calculate a noise carrier signal for each data in the data block. According to the sampling theorem, using this method a differential frequency corresponding to half of the value resulting from the repetition rate of the test sequences is achieved. In the case of 25 test sequences per second, the result is a correction-requiring differential frequency of ±12.5 Hz. Owing to the small frequency fluctuations of the carrier signals of broadcasting transmitters, therefore, this method can readily be used for such noise.

If the differential frequencies exceed this value, as is the case, for example, with noise emanating from display screens or power supply units, noise suppression is carried out as follows:

The noise signals, referred to in the following as noise lines, may be up to ±4.5 kHz away from the carrier. These limits correspond to those of the aforementioned bandwidth of the digital signal. If such a noise line influences the transmitted signals of a data block, it can be assumed that the noise line will also be measurable in the transmission gap. In order to determine the noise line, therefore, noise signal measurements are carried out in the periodic gaps and the period of the noise line is determined using a correlation. Subsequently, the determined sample of the noise line can be periodically continued. The correlation must be performed separately for the I and Q components, so that phase rotations are covered. In order to determine the precise position and magnitude of the noise line with regard to an associated data block, a new correlation is subsequently performed within each test sequence. The associated value of the noise, determined by interpolation, can then be subtracted from the respective data of the transmitted data block. Consequently, the wanted signal is also free of noise generated, for example, by display screens or power supply units.

Figure 1A:
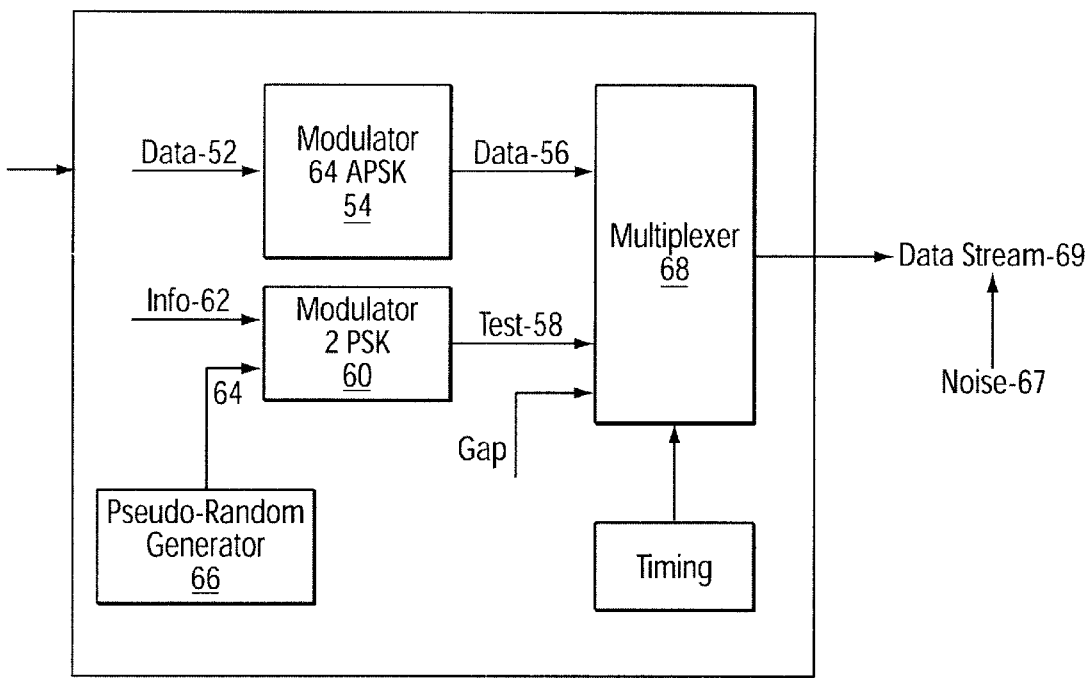
FIG. 1a shows a functional block diagram of a transmitter.
Figure 1B:
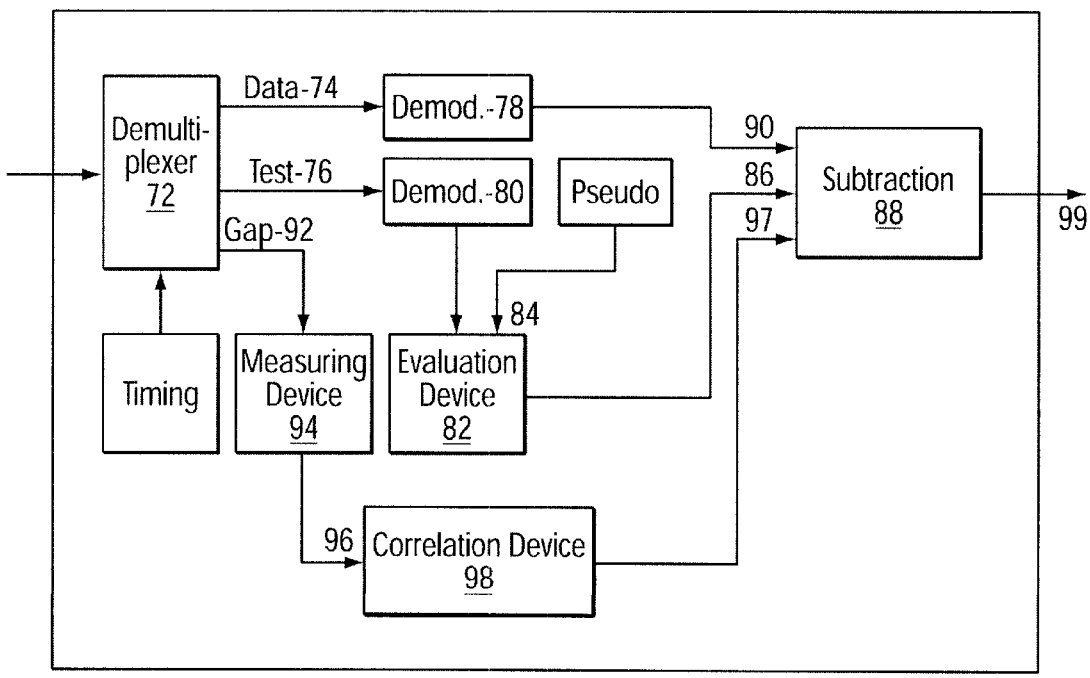
FIG. 1b shows a functional block diagram of a receiver.

With regard to the described process, FIGS. 1a and 1b show, for the purpose of illustration, functional block diagrams FIG. 1a showing the transmitter and FIG. 1b showing the receiver. The transmitter 50 is supplied with the binary data 52 of the wanted signal (digitized, for example, by an analogue/digital converter), where the data is converted by a 64 APSK modulator 54 into the corresponding modulated form 56. The test sequence is generated by a 2PSK modulator 60 which, in addition to the information 62 relevant for the receiver, modulates a binary data sequence 64 generated by a pseudo-random generator 66. This data sequence 64 is sufficiently long and also has no direct component, with the consequence that, when this binary data is averaged, the result is a predetermined value, preferably zero.

The two modulators 54 and 60 transmit their signals to a multiplexer 68 which generates the succession of sequences on data stream, 69 shown in FIG. 2a a gap being generated between each data block sequence and test sequence.

In the receiver 70, this data stream, 69 affected by noise 67 during transmission, is supplied to a demultiplexer 72 which separates the individual sequences from each other and supplies the data sequence 74 and the test sequence 76 each to their corresponding demodulators 78 and 80, respectively. From the test sequence, an evaluation device 82 derives the precise carrier frequency and the phase thereof as well as the precise clock pulse and phase of the clock pulse, this being required in order to recover the transmitted digital data. To be able to carry out this evaluation, the evaluation device is supplied with an identical pseudo-random data sequence 84 as for the transmitter 50.

The evaluation device 82 also carries out the averaging of a defined portion of the test sequence in order to determine the noise signal 86. This noise signal 86 is then supplied to a subtraction device 88 which subtracts it from the noise-affected data signal 90.

The noise signal received by the receiver during the gap 92 is measured by a measuring device 94. The measured signal 96 is then supplied to a correlation device 98 which determines the noise signal 97 from the measured signals of previous measurements and supplies it to the subtraction device 88. Available then at the output of the subtraction device is the wanted signal 97 without the noise signal 97.

What is claimed is:

1. A method for transmitting digital signals comprising:

modulating the digital signals onto a carrier;

transmitting a test sequence and the modulated digital signals in a periodic alternating fashion, the test sequence having essentially no direct component;

averaging the test sequence at a receiver end so as to detect a noise carrier; and subtracting the noise carrier from the demodulated digital signals at the receiver end.

2. The method as recited in claim 1 further comprising modulating the test sequence at a low level.

3. The method as recited in claim 2 wherein the modulating of the test sequence is performed using a 2PSK modulation.

4. The method as recited in claim 2 wherein the test sequence includes a pseudo-random data sequence having no direct component.

5. The method as recited in claim 2 wherein the transmitting of the test sequence is performed using repeating the test sequence at a frequency of 25 Hz.

6. The method as recited in claim 1 wherein the modulating is performed using a high-level modulation.

7. The method as recited in claim 6 wherein the high-level modulation includes at least one of 32 APSK and 64 APSK.

8. The method as recited in claim 1 wherein the transmitting is periodically stopped for a defined time.

9. The method as recited in claim 8 further comprising evaluating signals received at the receiver end during the time so as to detect the noise carrier.

10. The method as recited in claim 9 wherein the evaluating is performed using correlation methods.

* * * * *